United States Patent

Ward et al.

Patent Number: 5,838,525
Date of Patent: Nov. 17, 1998

[54] HIGH SPEED SINGLE-POLE TRIP LOGIC FOR USE IN PROTECTIVE RELAYING

[75] Inventors: Solveig Ward, Coral Springs, Fla.; Eric Udren, Corapolis, Pa.

[73] Assignee: ABB Power T&D Company, Inc., Raleigh, N.C.

[21] Appl. No.: 837,991

[22] Filed: Apr. 15, 1997

[51] Int. Cl.⁶ .................................................. H02H 3/00
[52] U.S. Cl. ............................ 361/69; 361/66; 361/80
[58] Field of Search ................................. 361/69, 64, 66, 361/68, 62, 63, 65, 67, 107, 93, 79–80; 364/483, 492

[56] References Cited

U.S. PATENT DOCUMENTS

| 4,254,444 | 3/1981 | Eriksson et al. | 361/82 |
|---|---|---|---|
| 4,438,475 | 3/1984 | Haley | 361/82 |
| 4,484,245 | 11/1984 | McFall | 361/88 |
| 4,528,611 | 7/1985 | Udren | 361/81 |
| 4,538,196 | 8/1985 | Sun et al. | 361/64 |
| 4,674,002 | 6/1987 | Li et al. | 361/66 |
| 4,725,914 | 2/1988 | Garitty | 361/76 |
| 4,896,241 | 1/1990 | Li et al. | 361/66 |
| 5,390,067 | 2/1995 | Eriksson et al. | 361/79 |
| 5,426,554 | 6/1995 | Nocentino, Jr. et al. | 361/64 |

OTHER PUBLICATIONS

ABB Brochure, "REL 512 Line Distance Protection Terminal," Jul. 1996.

*Primary Examiner*—Jeffrey A. Gaffin
*Assistant Examiner*—Michael J. Sherry
*Attorney, Agent, or Firm*—Woodcock Wasburn Kurtz Mackiewicz & Nossis LLP

[57] ABSTRACT

A protective relaying system includes a local protective relay operatively coupled to a protected line segment at a first location, and a remote protective relay operatively coupled to the protected line segment at a second location. The remote protective relay generates a signal (PILOT RECEIVE) to indicate the detection of a fault. This signal is communicated to the local protective relay and employed therein to supervise single-pole trip operations.

10 Claims, 4 Drawing Sheets

HIGH SPEED SINGLE-POLE TRIP LOGIC FOR USE IN PROTECTIVE RELAYING

FIELD OF THE INVENTION

The present invention relates generally to the field of protective relaying, and more particularly to apparatus and methods for providing high speed, single-pole tripping of a circuit breaker.

BACKGROUND OF THE INVENTION

Electrical transmission lines and power generation equipment must be protected against insulation faults and consequent short circuits, which could cause a collapse of the power system, serious and expensive equipment damage, and personal injury. It is the function of the protective relays, which monitor ac voltages and currents, to locate line faults and initiate isolation by the tripping of circuit breakers.

One type of protective relaying system employs a protective relay at each transmission line terminal. Using the measured ac voltages and currents, each protective relay operates independently to determine if a fault has occurred on the intervening protected line segment. This type of system usually provides high-speed simultaneous protection for only the faults in the middle section of the protected line. For faults occurring near the ends of the line, the protective relay nearest the fault clears the line at high speed. The relay remote from the fault clears the line with time delay unless system conditions provide high speed sequential tripping.

In another type of protective relaying system, known as "pilot" relaying, the protective relays at each end of the transmission line communicate with each other via a bidirectional communication link. The relays at each line terminal compare fault location information to determine if the fault is on the intervening line segment. If the comparison indicates that the detected fault is internal, i.e., between the two protective relays, the intervening protected line segment is isolated by tripping the circuit breakers at the line terminals. If the comparison indicates that the fault is not between the two protective relays, the circuit breakers remain closed. Pilot protection provides high speed protection for 100% of the protected line independent of system conditions. The communications channel linking the two relays can employ a modulated carrier signal transmitted over a power line phase conductor or a microwave system, or audio tones propagated on a leased telephone line or a dedicated pilot wire.

There are different types of pilot relaying. For example, the invention disclosed in U.S. Pat. No. 4,528,611, Jul. 9, 1985, to Eric A. Udren, a co-inventor of the present invention, relates to a blocking pilot relaying system. In such a system, the communications channel linking the protective relays at opposite ends of the protected line segment is used only to block one or more of those protective relays from tripping on an external fault.

To detect a fault with a pilot relaying system, either directional comparison relays or phase comparison relays may be used. In a directional comparison system, fault detecting relays compare the direction of power flow at the two line terminals. Power flow into the line at both terminals indicates an internal fault and the circuit breakers at each terminal of the line are tripped. If the power flows into the line at one terminal and out at the other, the fault is external and the line remains in service. A phase comparison system generally uses overcurrent fault detecting relays to detect the relative phase of the currents at the terminals. If the currents at the terminals are relatively in phase, an internal fault is indicated and the circuit breakers at both terminals of the line are tripped. If the currents at the terminals are relatively 180° degrees out of phase, an external fault is indicated and the breakers are not tripped.

The present invention is particularly directed to a protective relaying scheme in which a primary requirement is that the relay should trip only when the fault is on the protected line segment. As shown in FIG. 1, such a distance relaying system includes a local relay 10 and a remote relay 20 for each protected line segment 30. (Note that, although only one line is shown, there will typically be three protected line segments for the three phases of the transmission line spanning the protected zone. Previously, using electromechanical relays, the line would have been protected by a set of three relays, one for each phase, at each line end. Today, however, the relays are typically three-phase units and one such relay includes all input transformers and measuring circuits needed for the three phases.) There is also a zone 40 that is in the forward direction (to the right in FIG. 1) for local relay 10 and in the reverse direction for remote relay 20. The reach of local relay 10 is, in this example, 80% of the length ("L1") of the protected line. The most common type of distance relaying uses a mho characteristic, shown in the impedance plane in FIG. 2, wherein resistance R is plotted along the horizontal axis and reactance X is plotted along the vertical axis. The relaying system distinguishes between an internal fault at "A" and an external fault at "B" by using zones. A zone relates to an impedance measurement range with a predefined reach. The measured impedance is compared to the set reach, and the fault is assumed to be internal (i.e., within the protected zone) when the measured impedance is less than the reach. In other words, if the measured impedance is within the circle of FIG. 2, the fault may be assumed to be within zone 1 of FIG. 1, where zone 1 covers 80% of the total line length L1.

An instantaneous underreaching zone, zone 1 in FIG. 1, is normally set to detect faults within up to 80% of the protected line segment. The 80% value is a practical reach since errors in line impedance values and measuring inaccuracies from current and voltage transformers are introduced to the relay. In this type of system, the distance protection scheme is complemented with the pilot zone. To permit a trip as a result of a fault within the pilot zone, e.g., at "C" in FIG. 1, the local relay 10 employs a received pilot signal ("Pilot Receive"). The tripping criterion for the local relay 10 may be defined as:

Trip=(Zone 1) OR (Pilot Zone) AND (Pilot Receive). This logic equation means, essentially, that the local relay 10 will generate a trip signal to an associated circuit breaker if, on the one hand, a fault is detected in its protected zone (zone 1) or, on the other hand, a fault is detected in the pilot zone adjacent the remote relay and an appropriate signal is sent by the remote relay to the local breaker. Thus, a fault at "A" in FIG. 1 will cause a trip since it is in zone 1; a fault at "C" will cause a trip since it is in the pilot zone, and a fault at "B" will not cause a trip because it is not in zone 1 and remote relay 20 will not send a "Pilot Receive" signal since the fault at "B" is in the reverse direction.

Overreach

A transmission line is subject to different fault types, including single-phase-to-ground, two-phase, three-phase and two-phase-to-ground. The phenomenon of overreach may be caused by two-phase-to-ground faults. For a two-phase-to-ground fault, the ground element in the leading phase will overreach while the ground element in the lagging phase and the phase element will underreach. (Such ground and phase measuring elements are well known in the art of protective relaying. They are utilized in protective relays for a variety of functions, and operate on the basis of current and voltage measurements. Ground elements are used to detect faults involving one or more phases and ground. Phase elements are used to detect faults between phases. Generally, the operating quantities for a ground element are the phase current, phase voltage and ground current. The operating quantities for a phase element are phase—phase current and phase—phase voltage.) Overreaching by a relay is detrimental because it results in the relay tripping for an external fault. Traditionally, this was not a problem as distance ground elements were not used. Distance relays would only have phase elements and most ground faults would be detected by separate directional overcurrent relays. Modern distance protection systems, however, include ground distance elements and provisions must be made to avoid overreach with two-phase-to-ground faults. The most common method is to block the relay for the leading phase by the use of a phase selector.

Single-Pole Tripping

The strategy for single-pole tripping is to isolate only the faulted phase upon the occurrence of a single-phase-to-ground fault, and to isolate all three phases for all other faults. Single-pole tripping enhances power system stability as the two system segments that the transmission line interconnects remain metallically connected by the two unfaulted phases during the single-phasing period. As a result, a substantial amount of synchronizing power can flow. Moreover, the negative impact of voltage variation throughout the power system is reduced by single-pole tripping.

SUMMARY OF THE INVENTION

A primary object of the present invention is to provide a phase selection technique and corresponding logic for use in a protective relay to prevent overreach in the case of a two-phase-to-ground fault. Another object of the invention is to provide a phase selection technique and corresponding logic for single-pole tripping applications.

A protective relaying system in accordance with the present invention includes a local protective relay operatively coupled to a protected line segment at a first location, and a remote protective relay operatively coupled to the protected line segment at a second location remote from the first location. The local protective relay comprises signal generating means for identifying, and generating a signal (PF2PHGT) indicative of, a two-phase-to-ground fault. This signal is used by the local relay to supervise single-pole tripping operations. In presently preferred embodiments of the invention, the signal generating means includes a first combinational logic circuit, and the PF2PHGT signal is generated as a logic signal. The local protective relay preferably comprises a second combinational logic circuit for generating a single-pole tripping signal (Z1GT) in response to the PF2PHGT signal. The single-pole tripping signal Z1GT is blocked by the PF2PHGT signal (i.e., Z1GT is held low when PF2PHGT is high). Moreover, in preferred embodiments of the invention, the first and second logic circuits are each implemented in a digital signal processor. Other features of the invention are disclosed below.

DETAILED DESCRIPTION OF PREFERRED EMBODIMENTS

Figure 1:
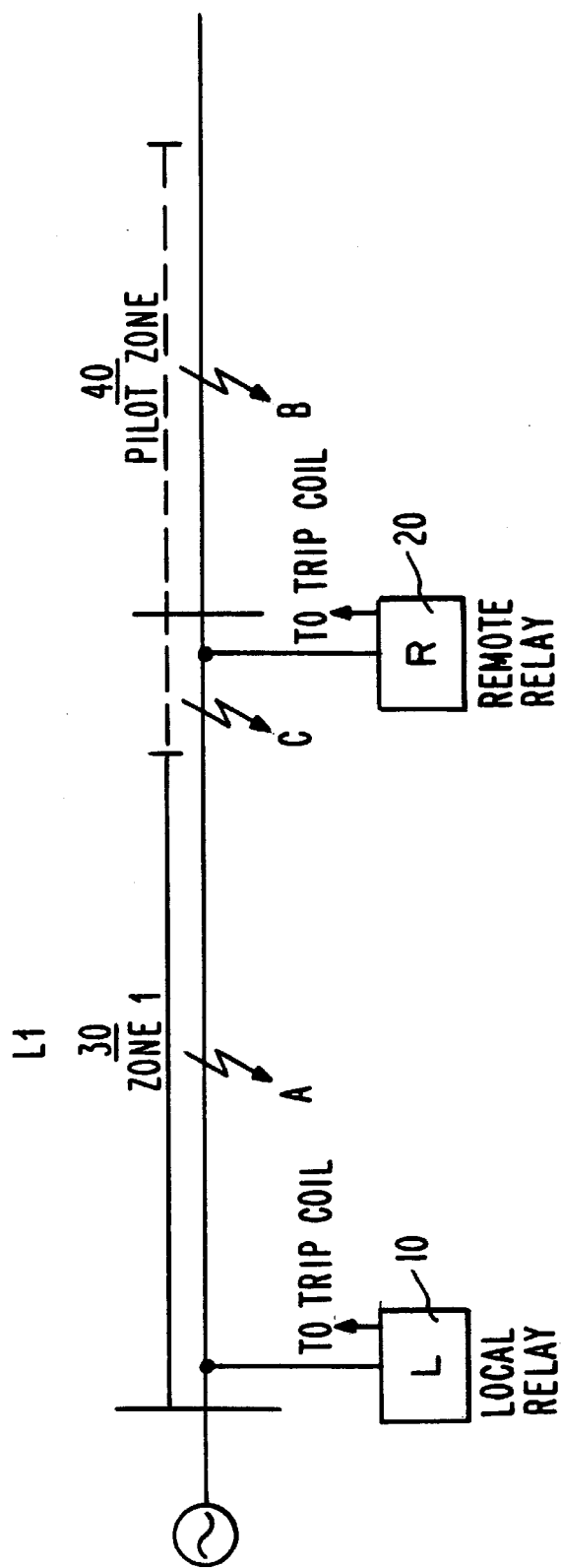
FIG. 1 schematically depicts a protective relaying system.
Figure 2:
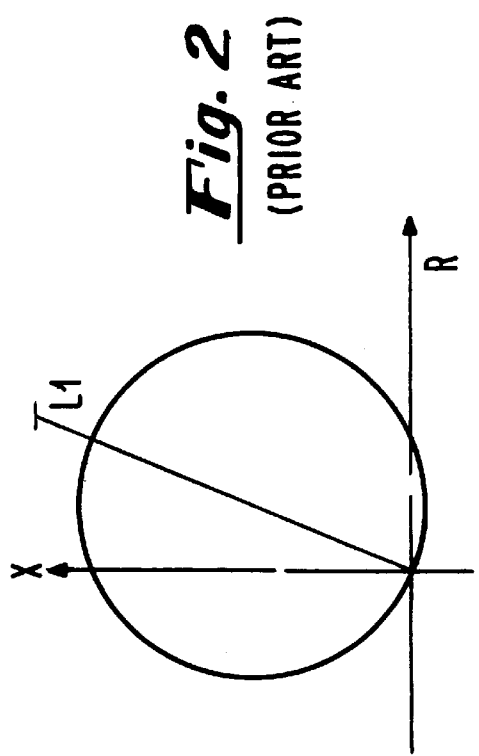
FIG. 2 an impedance plane diagram depicting a mho characteristic of a protective relaying system.
Figure 3:
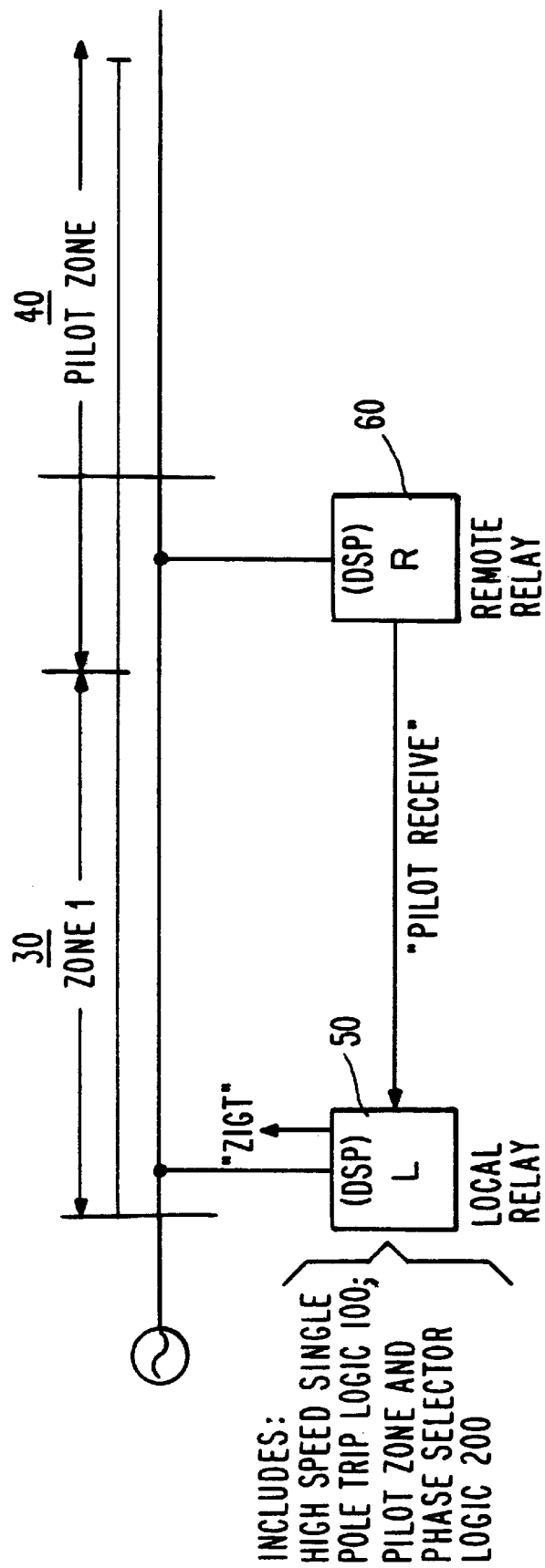
FIG. 3 schematically depicts a protective relaying system in which, in accordance with the present invention, a signal ("PILOT RECEIVE") is sent from the remote relay to the local relay to indicate the direction of the fault.

As shown in FIG. 3, a protective relaying system in accordance with the present invention preferably comprises local 50 and remote 60 digital signal processor (DSP) based and microprocessor based protective relays. The remote relay 60 signals the local or pilot relay 50 (with a signal called "PILOT RECEIVE") when a fault is seen by the remote relay 60 in its forward direction (to the left in FIG. 3). In a presently preferred embodiment of the invention, the PILOT RECEIVE signal is a logic signal modulated into a high frequency (kHz) signal and communicated over one of the phase lines.

Logic Circuits

Figure 4:
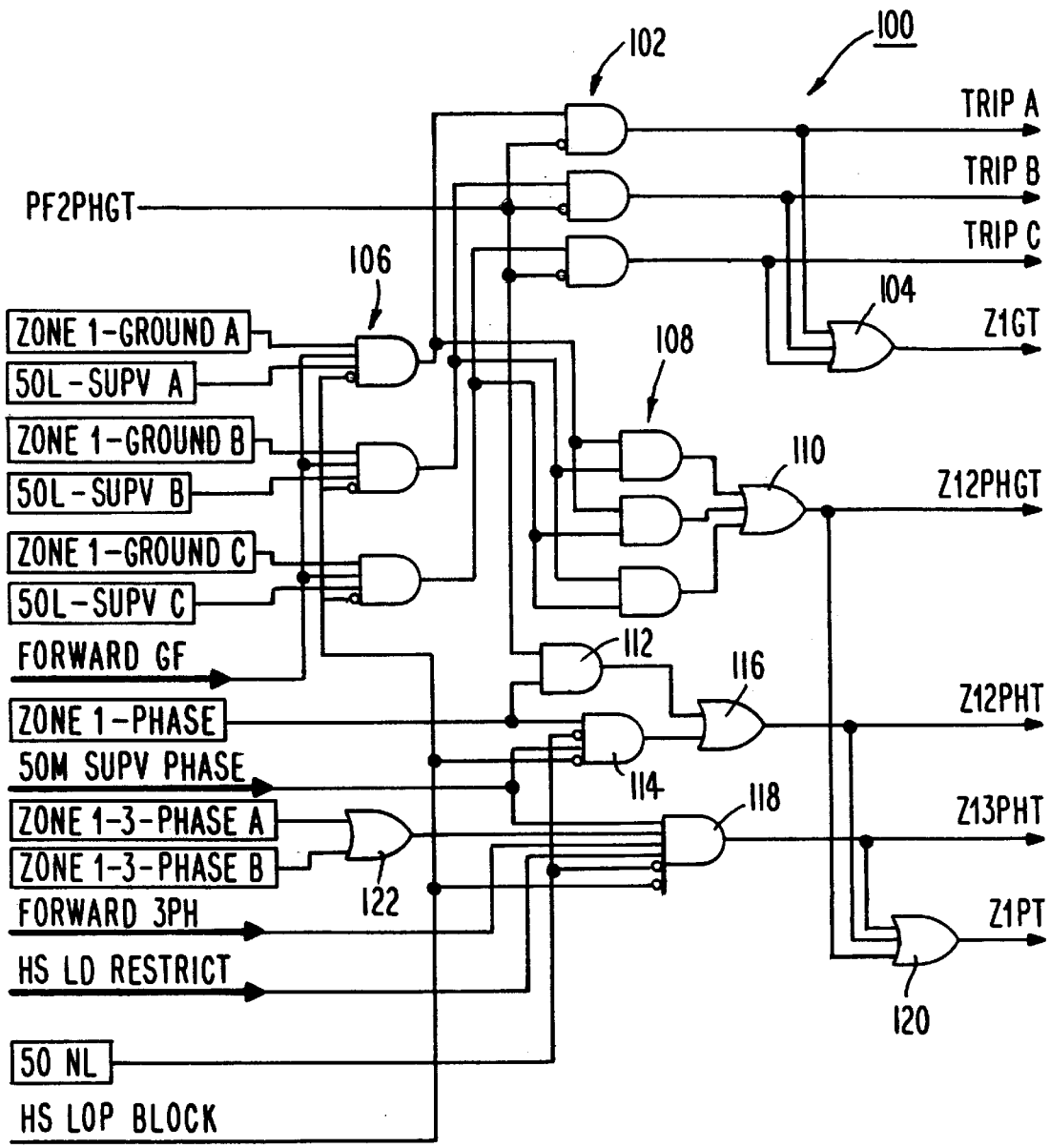
FIG. 4 schematically depicts a logic circuit in accordance with the present invention for generating at high-speed a single-pole trip signal ("Z1GT").
Figure 5:
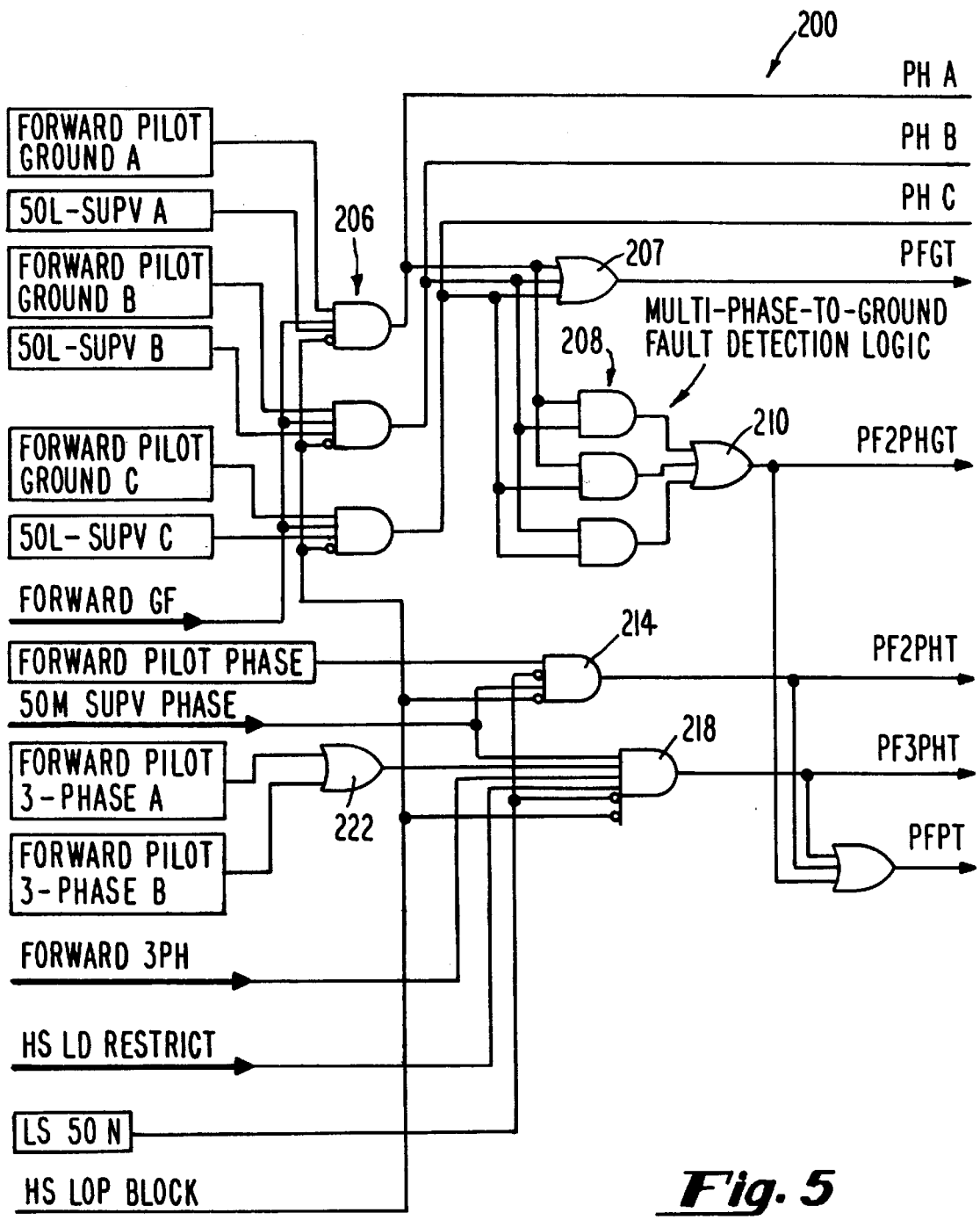
FIG. 5 schematically depicts a logic circuit in accordance with the present invention for generating the signal ("PF2PHGT") indicating the detection of a two-phase-to-ground fault.

The presently preferred implementation of the invention employs two high-speed combinational logic circuits. FIG. 4 depicts a high-speed single-pole trip logic circuit in accordance with the present invention, and FIG. 5 depicts a pilot zone and phase selector logic circuit for generating the blocking signal ("PF2PHGT") to be input to the circuit of FIG. 4. Both of these circuits are preferably implemented in a DSP or microprocessor of a protective relay, i.e., the circuits of FIGS. 4 and 5 are implemented in the DSP of the local relay 50. Similar circuits may also be used by the remote relay 60, but for brevity only their use in the local relay will be described. In the preferred implementation of the present invention, both the local and remote relays 50, 60 perform their own phase selection independently of the other relay. The local relay, e.g., generates the PF2PHGT signal that is fed to the zone 1 logic of the local relay. The local relay uses its "pilot zone," i.e., the zone used for sending signals to the remote end, as a phase selector. It should be noted, however, that any independent zone could be used for this purpose—the pilot zone is employed for phase selection purposes because it is already available in the relay and is suitable from an application point of view.

The logic circuits will now be described with particular reference to their respective inputs and outputs. The manner in which the inputs are combined by the logic elements (AND and OR gates) to generate the output signals will be clear to those skilled in the protective relaying art.

High Speed Single Pole Trip Logic

In the high-speed single-pole trip logic circuit of FIG. 4, the PF2PHGT signal individually supervises three single-pole tripping outputs, "TRIP A", "TRIP B", and "TRIP C". If the PF2PHGT signal is high, it indicates a multiphase fault and single-pole tripping is blocked, i.e., TRIP A, TRIP B, and TRIP C are held low. The three single-pole trip outputs are ORed together (OR gate 104) to form the signal Z1GT, which can also be used to initiate single-pole reclosing. In addition, PF2PHGT is used to enable (see AND gate 112) direct tripping of a zone 1 phase distance element (e.g., a KD-style mho circle) even if residual current picks up the LS50N element. This is done because the zone 1 phase element is a more accurate and reliable means of tripping for any faults involving two phases.

The various input and output signals will now be explained.

PF2PHGT: This signal is received from the circuit 200 (FIG. 5, described below) and is input to AND gates 102 and 112, as shown in FIG. 4. The PF2PHGT signal identifies a two-phase-to-ground fault and is used to block the zone 1 phase-ground elements from performing single-pole tripping. In other words, when PF2GHT is high, its inversion at the inputs of AND gates 102 will cause the outputs of those gates (TRIP A, TRIP B, TRIP C) to be low. The PF2PHGT signal also is ANDed with the zone 1 phase element (see "Zone 1-Phase" and AND gate 112 in FIG. 4) to generate the Z12PHT signal output by OR gate 116. This latter signal indicates a zone 1 two-phase fault. (The second path for the zone 1 phase element, through AND gate 114, could be blocked by zero sequence current above the set 50 NL level.)

Zone 1-Ground A: This is a phase-ground measuring element in phase A for zone 1. The measuring element uses a mho characteristic. Phase voltage and current are used as operating quantities and the voltage between the healthy phases is used for torque control. The output of this phase-ground measuring element is ANDed, by an AND gate 106, with a first signal ("Forward GF") output by a directional ground element, the output of a settable phase A current supervisor (50 L-Supv A), and an inverted HS LOP blocking signal.

50 L-Supv A: This is the settable phase A current supervision level. The current supervision is used to increase the security for low current, low voltage conditions. The phase-ground element is not allowed to operate unless the phase current exceeds this value.

Zone 1-Ground B: This is a phase-ground measuring element in phase B for zone 1.

50 L-Supv C: This is the settable phase C current supervision level.

Forward GF: The phase-ground measuring elements are supervised by a directional ground element. This increases the directional security of the elements.

Zone 1-Phase: This is the zone 1 phase measuring element. This single element will operate for all two-phase faults. Its output is input to AND gate 112 to be ANDed with the PF2PHGT signal.

50 M SUPV PHASE: This phase overcurrent level is input to AND gates 114 and 118, and is used to supervise tripping by the phase and three-phase elements. This signal thus controls the generation of the Z12PHT and Z13PHT signals indicating a zone 1 trip due to a two-phase or three-phase fault, respectively. This increases the security of the measuring elements.

Zone 1–3-Phase A: This is a three-phase measuring element for zone 1 using phase A current and voltage. Its output is ORed by OR gate 122 with the output of a corresponding phase B measuring element (Zone 1–3-Phase B), and then fed to AND gate 118 as shown.

Zone 1–3-Phase B: This is a three-phase measuring element for zone 1 using phase B current and voltage.

FORWARD 3PH: Signal from a directional element for supervising (by way of AND gate 118) the three-phase measuring elements.

HS LD RESTRICT: This signal is a blinder limiting the expansion of the mho characteristic into a possible load impedance. It is input to AND gate 118 and, when low, prevents Z13PHT from going high.

50 NL: This is a zero sequence overcurrent level element for blocking the phase and three-phase elements. Its inverted output is input to AND gates 114 and 118. Thus, when the 50 NL signal is high, the zone 1 three-phase fault trip signal (Z13PHT) is kept low.

HS LOP BLOCK: A measuring element to block all tripping elements for out of step conditions. This signal is inverted and input to AND gates 106, 114 and 118, as shown.

TRIP A: Trip signal to the circuit breaker, phase A.

TRIP B: Trip signal to the circuit breaker, phase B.

TRIP C: Trip signal to the circuit breaker, phase C.

Z1GT: Logic signal indicating a zone 1 single-pole trip.

Z12PHGT: Logic signal indicating a zone 1 trip due to a two-phase-to-ground fault.

Z12PHT: Logic signal indicating a zone 1 trip due to a two-phase fault.

Z13PHT: Logic signal indicating a zone 1 trip due to a three-phase fault.

Z1LPT: Trip signal for three-pole tripping for two-phase, two-phase-to-ground and three-phase faults.

Pilot Zone and Phase Selector Logic

The pilot zone and phase selector logic circuit, depicted in FIG. 5, is also contained within the local relay 50 (FIG. 3). As explained below, three ground distance pilot elements are individually supervised by directional, overcurrent, and loss-of-potential measuring elements. The outputs of these elements are available individually for single-pole pilot tripping. The combined, ORed (see OR gate 207) output PFGT is also provided for single-pole reclosing initiation. The pilot ground distance elements are typically set to about 150% of the protected line length. The multiphase-fault detection logic (to detect a fault in 2 or more out of 3 phases) yields the PF2PHGT output (see AND gates 208 and OR gate 210). Note that, for faults which fall in zone 1 (80 to 90 percent of the protected line), PF2PHGT will be high for any fault other than a single-phase-to-ground fault. Thus, it may be used as a fault type selector for supervising zone 1 tripping.

The input and output signals will now be identified.

Forward Pilot Ground A: This is the phase-ground measuring element in phase A for the pilot zone. Its output is input to one of a first set of AND gates 206. The measuring element uses a mho characteristic. Phase voltage and current are used as operating quantities and the voltage between the healthy phases is used for torque control.

Forward Pilot Ground B: Phase-ground measuring element in phase B for the pilot zone.

Forward Pilot Ground C: Phase-ground measuring element in phase C for the pilot zone.

Forward Pilot Phase: This pilot zone phase measuring element will operate for all two-phase faults. Its output is fed to AND gate 214 along with the LS 50 N, 50 M Supv Phase and HS LOP Block signals.

Forward Pilot 3-Phase A: The output of this three-phase measuring element for the pilot zone using phase A current and voltage is fed to OR gate 222 along with the output of the three-phase measuring element for phase B.

Forward Pilot 3-Phase B: Three-phase measuring element for the pilot zone using phase B current and voltage.

LS 50 N (the same as 50 NL): A zero sequence overcurrent level blocking the phase and three-phase elements.

HS LOP Block: A measuring element to block all tripping elements for out of step conditions.

PH A: Logic signal indicating a phase A to ground fault.

PH B: Logic signal indicating a phase B to ground fault.

PH C: Logic signal indicating a phase C to ground fault.

PFGT: Logic signal indicating a pilot zone ground element operation. As shown, this signal is output by OR gate 207, and it is high if any one of the outputs of AND gates 206 is high. Thus, PFGT can be blocked, or kept low, by the HS LOP Block signal.

PF2PHGT: As discussed above, this signal is sent to the local relay 50 to identify a two-phase-to-ground fault. It is used by the local relay to block the zone 1 phase-ground elements from performing single-pole tripping. As shown, the PF2PHGT signal is generated by AND gates 206 and 208 and OR gate 210. Using the PH A, PH B, and PH C signals as a starting point, the logic equation for PF2PHGT is:
PF2PHGT=(PH A AND PH B) OR (PH A AND PH C) OR (PH B AND PH C).

PF2PHT: This logic signal is output by AND gate 214 and indicates a pilot zone operation due to a two-phase fault.

PH3PHT: This logic signal is output by AND gate 218 and indicates a pilot zone operation due to a three-phase fault.

PFPT: This signal is output by OR gate 220 and indicates a pilot zone operation for two-phase, two-phase-to-ground and three-phase faults. In other words, it is high if any one of PF2PHGT, PF2PHT or PF3PHT is high.

Application Considerations

The user should coordinate the zones by insuring that, for all two-phase-to-ground faults on the protected line section, the underreaching lagging-phase ground distance pilot zone will not fail to pick up. This should not be a problem unless a very long line is protected, with a short line off the remote bus, and an unusual network connection in which an adequate pilot zone reach setting is prohibited. Similar supervision is not needed for single-pole pilot tripping, since the pilot zones are normally set to grossly overreach and are supervised by the communicated directional indication (PILOT RECEIVE) from the remote terminal 60. For any multiphase fault actually on the protected line section, multiple ground distance pilot elements will pick up and initiate three-pole tripping. For unusual applications in which the pilot zone may be set closer than normal to the end of the protected line, the same operating principle can be achieved by using a separate phase selector ground distance zone set to a longer reach. In this case, it may be desirable or necessary to supervise the pilot zone single-pole tripping in the same way that zone 1 tripping is supervised in FIG. 4.

Modifications and variations of the presently preferred embodiments of the invention will be apparent in view of the above detailed disclosure. For example, as discussed above, a separate phase selector ground zone may be employed. Accordingly, the scope of protection of the following claims is not intended to be limited to the presently preferred embodiments.

We claim:

1. A protective relaying system, comprising:
   (a) a local distance relay operatively coupled to a protected line segment at a first location; and
   (b) a remote protective relay operatively coupled to said protected line segment at a second location remote from said first location,
   wherein said local distance relay comprises signal generating means for identifying, and generating a first logic signal (PF2PHGT) indicative of, a two-phase-to-ground fault, wherein said first logic signal is employed by said local distance relay to supervise single-pole trip operations; and wherein said local distance relay determines fault type without the use of phasor information obtained from said remote protective relay.

2. A protective relaying system as recited in claim 1, wherein said signal generating means comprises a first combinational logic circuit.

3. A protective relaying system as recited in claim 1, wherein said local distance relay further comprises a second combinational logic circuit for generating a single-pole tripping signal (Z1GT) in response to said first logic signal (PF2PHGT), wherein said single-pole tripping signal (Z1GT) is held low when said first logic signal (PF2PHGT) is high.

4. A protective relaying system as recited in claim 2, wherein said first logic circuit is implemented in a digital signal processor or microprocessor.

5. A protective relaying system as recited in claim 3, wherein said second logic circuit is implemented in a digital signal processor or microprocessor.

6. A protective relaying system as recited in claim 1, wherein said signal generating means comprises a first combinational logic circuit; and wherein said local distance relay comprises a second combinational logic circuit for generating a single-pole tripping signal (Z1GT) in response to said first logic signal (PF2PHGT), wherein said single-pole tripping signal (Z1GT) is held low when said first logic signal is high.

7. A protective relaying system as recited in claim 6, wherein said first and second logic circuits are each implemented in a digital signal processor or microprocessor.

8. A distance relay adapted to be operatively coupled to a protected line segment, comprising a logic circuit for generating a first logic signal (PF2PHGT) to indicate the detection of a two-phase-to-ground fault, and means for employing the first logic signal to supervise single-pole trip operations; said distance relay determining fault type without use of phasor information derived from a remote relay.

9. A distance relay as recited in claim 8, wherein said logic circuit is implemented in a digital signal processor or microprocessor.

10. A digital signal processor or microprocessor for use in a protective relay adapted to be operatively coupled to a protected line segment, comprising a first logic circuit for identifying, and generating a signal (PF2PHGT) indicative of, a two-phase-to-ground fault, and a second logic circuit for using said signal to supervise single-pole trip operations.

* * * * *